United States Patent
Oetjen et al.

[11] Patent Number: 5,956,997
[45] Date of Patent: Sep. 28, 1999

[54] WORM GEAR WITH A GEAR RING NUT

[75] Inventors: Jürgen Oetjen; Alexander Zernickel, both of Herzogenaurach, Germany

[73] Assignee: INA Wälzlager Schaeffler OHG, Germany

[21] Appl. No.: 08/973,257

[22] PCT Filed: May 15, 1996

[86] PCT No.: PCT/EP96/02085

§ 371 Date: Dec. 3, 1997

§ 102(e) Date: Dec. 3, 1997

[87] PCT Pub. No.: WO97/01719

PCT Pub. Date: Jan. 16, 1997

[30] Foreign Application Priority Data

Jun. 28, 1995 [DE] Germany ............... 195 23 395

[51] Int. Cl.⁶ ............... F16H 25/24; F16H 27/02
[52] U.S. Cl. ............... 74/89.15; 74/459; 74/424.8 R
[58] Field of Search .............. 74/25, 459, 424.8 R, 74/89.14, 89.15

[56] References Cited

U.S. PATENT DOCUMENTS

| | | | |
|---|---|---|---|
| 2,482,082 | 9/1949 | Wahlberg | 74/459 |
| 2,556,572 | 6/1951 | Brinkhurst | 74/424.8 R |
| 2,616,302 | 11/1952 | Wahlmark | 74/459 |
| 2,876,653 | 3/1959 | Meyer | 74/424.8 R |
| 3,277,736 | 10/1966 | Goodman | 74/424.8 R |
| 3,380,316 | 4/1968 | Wilkinson | 74/424.8 R |
| 3,592,070 | 7/1971 | Hammond | 74/89.15 |
| 3,614,900 | 10/1971 | Wahlmark | 74/424.8 R |
| 3,730,016 | 5/1973 | Miller . | |
| 3,733,914 | 5/1973 | Sheesley | 74/89.15 |
| 3,751,998 | 8/1973 | Vasilatos | 74/89.15 |
| 4,727,762 | 3/1988 | Hayashi | 74/89.15 |

FOREIGN PATENT DOCUMENTS

| | | |
|---|---|---|
| 122 596 | 10/1984 | European Pat. Off. . |
| 29 01 826 | 7/1980 | Germany . |
| 30 32 955 | 3/1981 | Germany . |
| 38 08 375 | 10/1989 | Germany . |

*Primary Examiner*—Tamara L. Graysay
*Assistant Examiner*—Debra A. Belles
*Attorney, Agent, or Firm*—Henry M. Feiereisen

[57] ABSTRACT

A worm gear for transforming a rotary motion into a reciprocating motion comprises a threaded spindle (2) which is mounted for rotation on at least one needle roller bearing (5) in a gear ring nut (22) which functions as a housing (21). A profiled gear ring (19) engages the thread of the spindle (2) at one peripheral point for axially displacing the gear ring nut (22). This gear ring (19) surrounds the threaded spindle (2) and is arranged eccentric to the spindle axis (3). Further, the gear ring (19) is surrounded by a radial rolling bearing on which the gear ring (19) is rotatably mounted in the housing (21). According to the invention, the housing (21) is composed of rotationally symmetrical sheet metal parts made by chipless deep drawing, the inner surfaces of which sheet metal parts directly comprise the outer rolling element raceways for the bearings. In this way, an easy-to-mount worm gear with a simplified structure is obtained.

10 Claims, 2 Drawing Sheets

WORM GEAR WITH A GEAR RING NUT

FIELD OF THE INVENTION

The invention concerns a worm gear for transforming a rotary motion into a reciprocating (linear) motion, comprising a threaded spindle which is mounted for rotation on at least one needle roller bearing in a gear ring nut which functions as a housing, a profiled gear ring engaging a thread of the spindle at one peripheral point for axially displacing the gear ring nut, the gear ring which surrounds the threaded spindle being arranged eccentric to the spindle axis while being surrounded by a radial rolling bearing on which the gear ring is rotatably mounted in the housing.

BACKGROUND OF THE INVENTION

A worm gear of this type is known from EP-PS 0 122 596 and comprises two gear rings arranged with ball bearings in a housing, the outer rings of the ball bearings being arranged in special rolling bearing receiving elements which surround the threaded spindle. The needle roller bearings which serve as radial supports for the gear ring nut likewise have separate outer or gear rings. This makes the structure rather complicated on the whole.

SUMMARY OF THE INVENTION

The object of the invention is to create an easy-to-mount worm gear with a simplified structure.

The invention achieves this object by the fact that the housing is composed of rotationally symmetrical sheet metal parts made by chipless deep drawing, the inner surfaces of which sheet metal parts directly comprise the outer rolling element raceways for the bearings. The housing can therefore be assembled from hardened, drawn parts which at the same time serve as bearing raceways. This results in a compact structure of the worm gear which thus comprises only a few individual parts.

At its end remote from the gear ring, the housing can be configured in the direction of the spindle axis as a pot-shaped piston. Thus, it is closed at one end and the threaded spindle is protected from damage and pollution. Besides this, lubricant cannot be lost and thus remains inside the gear ring nut.

The housing comprises an outer bearing ring for the needle roller bearing of the threaded spindle and, connected thereto, an outer bearing ring for the radial rolling bearing of the gear ring. The bearing ring for the needle roller bearing and the bearing ring for the radial rolling bearing can be made together in one piece as a sheet metal part so that a particularly simple embodiment results.

The radial rolling bearing for the gear ring can be configured as a ball bearing transmitting both axial and radial forces. It is, however, also possible to configure the radial rolling bearing for the gear ring as a needle roller bearing in which case the gear ring is rotatably mounted in the housing on two additional axial needle roller bearings. Such a construction offers the advantage of higher axial rigidity and higher basic load ratings than obtained by using a ball bearing because needle roller bearings usually have higher load ratings and stiffness. Besides this, the design space requirement is smaller in the case of needle roller bearings.

The raceways for the rolling bearings of the gear ring are constituted directly by the surfaces of the gear ring. The gear ring can be retained axially in the housing by an inwardly bent edge of the housing. It is possible to arrange two needle roller bearings for the threaded spindle in the housing, one of said two needle roller bearings being arranged on each side of the gear ring. In this case, the housing can comprise an additional bearing ring for the second needle roller bearing of the threaded spindle, said additional bearing ring being axially retained on the bent-over edge of the housing by an adjoining flange.

BRIEF DESCRIPTION OF THE DRAWINGS

Examples of embodiment of the invention are represented in the drawings and will be described more closely below. In the drawings

DETAILED DESCRIPTION OF THE DRAWINGS

Figure 1:
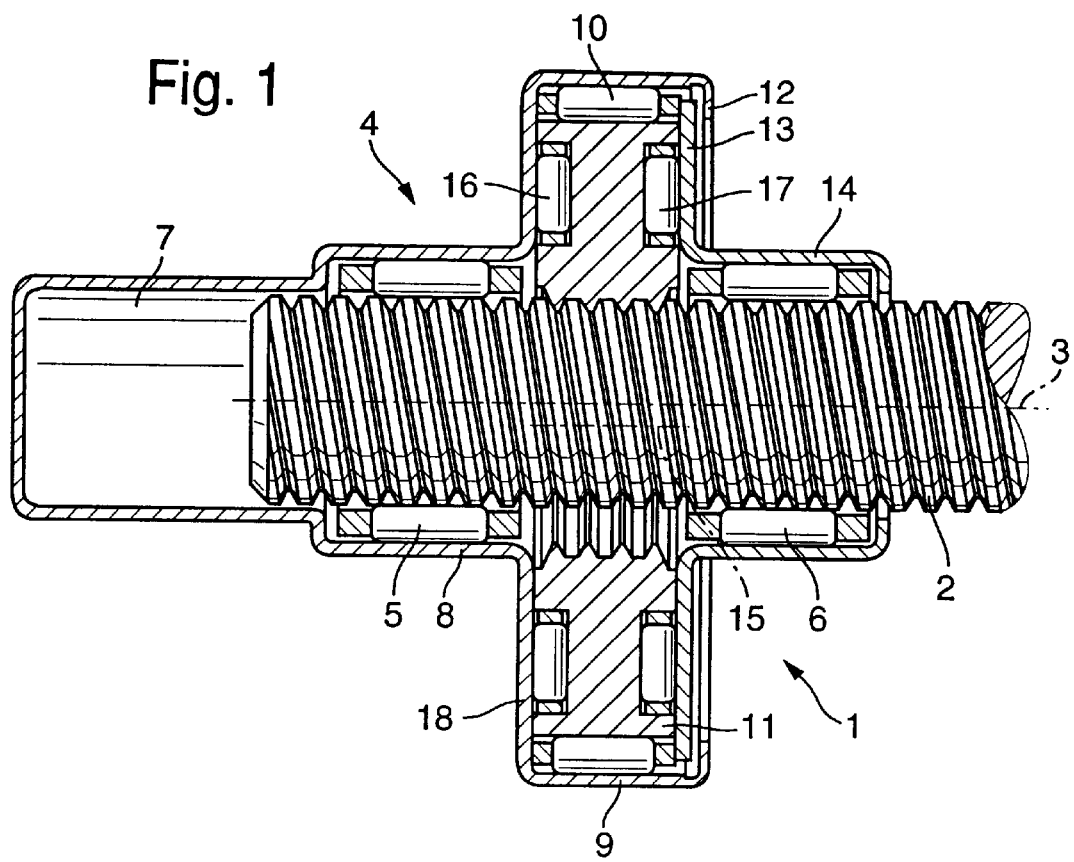
FIG. 1 is a longitudinal section through a worm gear whose gear ring is mounted in the housing on two axial needle roller bearings and one radial needle roller bearing.

A worm gear of the invention represented in FIG. 1 comprises a gear ring nut 1 which surrounds a threaded spindle 2 by which said gear ring nut 1 is displaced in axial direction upon a rotation of the spindle 2 about the spindle axis 3. The gear ring nut 1 constitutes a housing 4 in which the threaded spindle 2 is mounted for rotation on two needle roller bearings 5 and 6. The housing 4 is made up of two deep drawn sheet metal parts. The larger one of these two parts comprises a pot-shaped piston 7 which closes the receiving space for the threaded spindle 2 at one axial end, an outer bearing ring 8 for the needle roller bearing 5 and an outer bearing ring 9 for a radial rolling bearing configured as a needle roller bearing 10 on which a gear ring 11 is rotatably mounted in the housing 4. At its end opposite the pot-shaped piston 7, this part of the housing 4 ends in an edge 12 bent over from the outer bearing ring 9.

Axially next to this, there is arranged a further deep drawn sheet metal part having a flange 13 which continues into a further bearing ring 14 for the second needle roller bearing 6 of the threaded spindle 2. The housing 4 is held together by the fact the flange 13 which is situated within the outer bearing ring 9 is retained axially by the edge 12.

The axis 15 of the gear ring 11 is parallel to the spindle axis 3. The gear ring 11 is therefore arranged eccentrically with respect to the threaded spindle 2 and meshes at one peripheral point with grooves of the outer thread of the threaded spindle 2. Since the gear ring 11 is in rolling contact with the threaded spindle 2, it is forced to rotate when the threaded spindle 2 rotates within the housing 4. To enable the transmission of axial forces from the gear ring 11 to the housing 4, this worm gear comprises axial needle roller bearings 16 and 17 by which the gear ring 11 is axially mounted in the housing 4. These bearings are arranged directly on the two end faces of the gear ring 11 so that the gear ring 11 forms their raceways. The outer bearing surface for the needle roller bearing 16 is constituted by a flange region 18 of the part of the housing comprising the pot-shaped piston 7, while the outer bearing raceway for the rolling elements of the axial needle roller bearing 17 is provided by the flange 13 of the part of the housing comprising the additional bearing ring 14.

Figure 2:
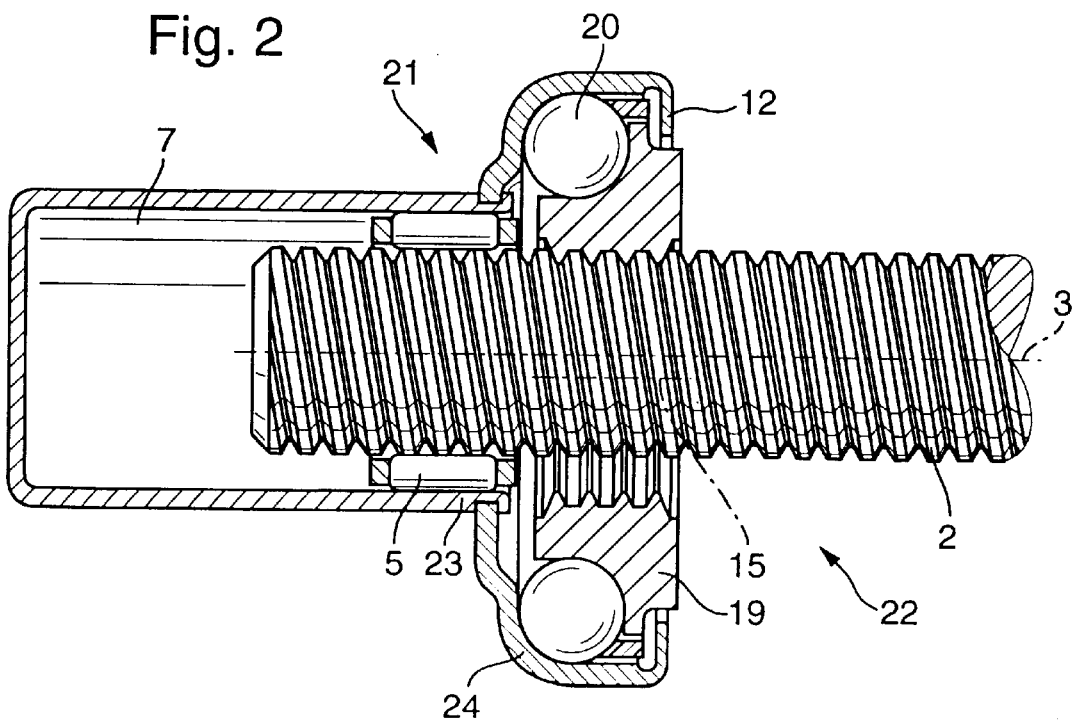
FIG. 2 is a longitudinal section through a worm gear comprising a ball bearing, the housing of the worm gear being made up of two parts.
Figure 3:
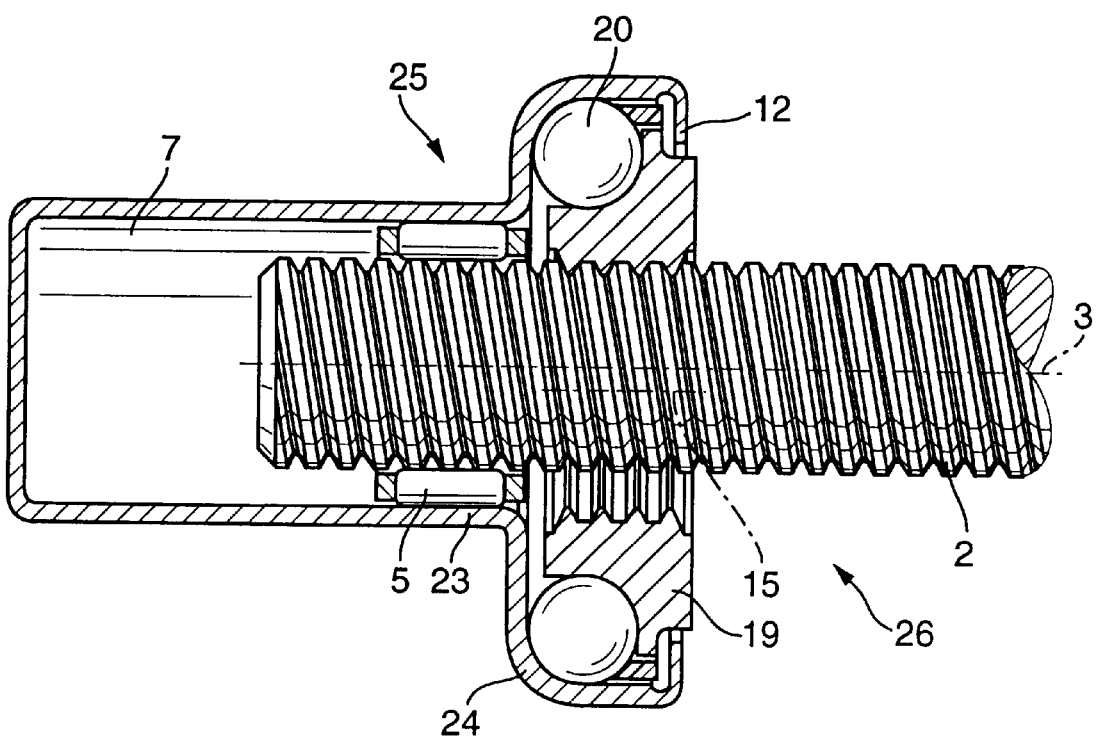
FIG. 3 is a longitudinal section through a worm gear whose housing is formed integrally with two rolling bearing rings.

In the embodiments of FIGS. 2 and 3, the threaded spindle 2 is mounted only on one needle roller bearing 5. In this case, a pressure force can be exerted on the pot-shaped piston 7 in the direction of the spindle axis 3 by the gear ring 19 through its radial rolling bearing which is configured as a ball bearing 20. The housing 21 of the gear ring nut 22 of FIG. 2 comprises two deep drawn sheet metal parts, namely the part comprising the pot-shaped piston 7 and an outer bearing ring 23 for the needle roller bearing 5 of the threaded spindle 2, and the part comprising the outer bearing ring 24 for the mounting of the ball bearing 20 for the gear ring 19. These two parts are joint to each other in the region of the needle roller bearing 5 by mechanical means.

In the embodiment of FIG. 3, the housing 25 of the gear ring nut 26 is made in one piece with the outer bearing ring 23 of the needle roller bearing 5 and the outer bearing ring 24 of the radial rolling bearing of the gear ring 19. Similar to the housing 4 of FIG. 1 and the housing 21 of FIG. 2, the housing 25 also comprises an inwardly bent edge 12 by which the gear ring 19, whose axis 15 is offset from the spindle axis 3, is retained axially within the housing.

| List of Reference Numbers | |
|---|---|
| 1 | Gear ring nut |
| 2 | Threaded spindle |
| 3 | Spindle axis |
| 4 | Housing |
| 5 | Needle roller bearing |
| 6 | Needle roller bearing |
| 7 | Pot-shaped piston |
| 8 | Outer bearing ring |
| 9 | Outer bearing ring |
| 10 | Needle roller bearing |
| 11 | Gear ring |
| 12 | Bent-over edge |
| 13 | Flange |
| 14 | Bearing ring |
| 15 | Gear ring axis |
| 16 | Axial bearing |
| 17 | Axial bearing |
| 18 | Flange region |
| 19 | Gear ring |
| 20 | Ball bearing |
| 21 | Housing |
| 22 | Gear ring nut |
| 23 | Outer bearing ring |
| 24 | Outer bearing ring |
| 25 | Housing |
| 26 | Gear ring nut |

We claim:

1. A worm gear for transforming a rotary motion into a reciprocating (linear) motion, comprising a threaded spindle which is mounted for rotation on at least one needle roller bearing in a gear ring nut which functions as a housing, a profiled gear ring engaging a thread of the spindle at one peripheral point for axially displacing the gear ring nut, the gear ring which surrounds the threaded spindle being arranged eccentric to the spindle axis while being surrounded by a radial rolling bearing on which the gear ring is rotatably mounted in the housing, wherein the housing (4, 21, 25) is composed of rotationally symmetrical sheet metal parts made by chipless deep drawing, said sheet metal parts having inner surfaces which directly comprise outer rolling element raceways for said needle roller bearing and said radial rolling bearing.

2. A worm gear of claim 1, wherein an end of the housing (4, 21, 25) remote from the gear ring (11, 19) is configured in spindle direction as a pot-shaped piston (7).

3. A worm gear of claim 1, wherein the housing (4, 21, 25) comprises an outer bearing ring (8, 23) forming one of the raceways for the needle roller bearing (5) of the threaded spindle (2) and, connected to said outer bearing ring (8), a further outer bearing ring (9, 24) forming another one of the raceways for the radial rolling bearing of the gear ring (11, 19).

4. A worm gear of claim 3, wherein the bearing ring (8, 23) for the needle roller bearing (5) of the threaded spindle (2) and the bearing ring (9, 24) for the radial rolling bearing of the gear ring (11, 19) are made together in one piece as a sheet metal part.

5. A worm gear of claim 3, wherein the radial rolling bearing for the gear ring (19) is configured as a ball bearing (20).

6. A worm gear of claim 3, wherein the radial rolling bearing for the gear ring (11) is configured as a needle roller bearing (10), and further comprising two additional axial needle roller bearings (16, 17) for rotatably supporting the gear ring (11) in the housing (4) in axial direction, said axial needle roller bearings (16, 17) being positioned on opposite end faces of the gear ring.

7. A worm gear of claim 6, wherein the gear ring (11, 19) has surfaces which directly form inner raceways for the rolling bearings (10, 16, 17, 20) of the gear ring (11, 19).

8. A worm gear of claim 1, wherein the gear ring (11, 19) is retained axially in the housing (4, 21, 25) by an inwardly bent edge (12) of the housing (4, 21, 25).

9. A worm gear of claim 8, wherein two needle roller bearings (5, 6) for the threaded spindle (2) are arranged in the housing (4), one of said needle roller bearings (5, 6) being arranged on each side of the gear ring (11).

10. A worm gear of claim 9, wherein the housing (4) comprises an additional bearing ring (14) for the second needle roller bearing (6) of the threaded spindle (2), said additional bearing ring (14) being retained on the bent-over edge (12) of the housing (4) by an adjoining flange (13).

* * * * *